US012452400B1

(12) United States Patent
Sherpa

(10) Patent No.: US 12,452,400 B1
(45) Date of Patent: Oct. 21, 2025

(54) SYSTEMS AND METHODS FOR PRESENTING MULTIPLE VIEWS OF VIDEOS

(71) Applicant: GoPro, Inc., San Mateo, CA (US)

(72) Inventor: David Sherpa, Paris (FR)

(73) Assignee: GoPro, Inc., San Mateo, CA (US)

( * ) Notice: Subject to any disclaimer, the term of this patent is extended or adjusted under 35 U.S.C. 154(b) by 45 days.

(21) Appl. No.: 18/514,983

(22) Filed: Nov. 20, 2023

(51) Int. Cl.
*H04N 13/351* (2018.01)

(52) U.S. Cl.
CPC .................................. *H04N 13/351* (2018.05)

(58) Field of Classification Search
CPC ........... H04N 13/351; H04N 21/47217; H04N 21/816; H04N 23/62; H04N 5/04; H04N 5/2628; G06T 2200/24; G06T 7/20
USPC ...................................................... 348/39, 51
See application file for complete search history.

(56) References Cited

U.S. PATENT DOCUMENTS 11,190,680 B1 * 11/2021 Tran ...................... H04N 23/64
11,200,918 B1 * 12/2021 Corbin ................... G11B 27/34

* cited by examiner

*Primary Examiner* — Christopher S Kelley
*Assistant Examiner* — Ana Picon-Feliciano
(74) *Attorney, Agent, or Firm* — Esplin & Associates, PC

(57) ABSTRACT

A graphical user interface may provide multiple views of a spherical video at the same time. The multiple views of the spherical video may include a front view and a rear view of the spherical video. The extent of the spherical video included within the front view may be controlled by the user. The extent of the spherical video included within the rear view may be automatically determined based on the extent of the spherical video included within the front view. The extent of the spherical video included within the rear view may be automatically determined to include the extent of the spherical video opposite the extent included within the front view.

20 Claims, 8 Drawing Sheets

SYSTEMS AND METHODS FOR PRESENTING MULTIPLE VIEWS OF VIDEOS

FIELD

This disclosure relates to presenting multiple views of videos.

BACKGROUND

A video may have a wide field of view (e.g., spherical field of view). The wide field of view of the video may make it difficult to see different spatial parts of the video at the same time.

SUMMARY

This disclosure relates to presenting multiple views of videos. Video information, framing information, and/or other information may be obtained. The video information may define a video. The video may have a progress length. The video may include visual content viewable as a function of progress through the progress length of the video. The visual content may have a field of view. The framing information for the video may define first framing of the visual content. The first framing may define positioning of a first viewing window within the field of view of the visual content. Second framing of the visual content may be determined based on the first framing of the visual content and/or other information. The second framing may define positioning of a second viewing window within the field of view of the visual content. Presentation of a graphical user interface on an electronic display may be effectuated. The graphical user interface may include presentation of a first punchout of the visual content based on the first viewing window and a second punchout of the visual content based on the second viewing window.

A system for presenting multiple views of videos may include one or more electronic storages, one or more processors, and/or other components. An electronic storage may store video information, information relating to a video, information relating to visual content, framing information, information relating to framing of visual content, information relating to viewing windows, information relating to a graphical user interface, information relating to punchouts of visual content, and/or other information.

The processor(s) may be configured by machine-readable instructions. Executing the machine-readable instructions may cause the processor(s) to facilitate presenting multiple views of videos. The machine-readable instructions may include one or more computer program components. The computer program components may include one or more of a video information component, a framing information component, a framing component, a graphical user interface component, and/or other computer program components.

The video information component may be configured to obtain video information and/or other information. The video information may define a video. The video may have a progress length. The video may include visual content viewable as a function of progress through the progress length of the video. The visual content may have a field of view. In some implementations, the video may include a spherical video.

The framing information component may be configured to obtaining framing information and/or other information. The framing information for the video may define first framing of the visual content. The first framing may define positioning of a first viewing window within the field of view of the visual content. The first framing may position the first viewing window over a first extent of the visual content.

The framing component may be configured to determine second framing of the visual content. The second framing of the visual content may be determined based on the first framing of the visual content and/or other information. The second framing may define positioning of a second viewing window within the field of view of the visual content. The second framing may be determined based on the first framing to position the second viewing over a second extent of the visual content. The second extent of the visual content may be different from the first extent of the visual content. In some implementations, the second extent of the visual content within the second viewing window may be opposite the first extent of the visual content within the first viewing window.

In some implementations, horizon leveling is not applied to the first viewing window. The horizon leveling may be applied to the second viewing window.

In some implementations, the size of the first viewing window may be dynamic, and the size of the second viewing window may be static. In some implementations, the size of the first viewing window may be dynamic, and the size of the second viewing window may be dynamic. The size of the second viewing window may be determined based on the size of the first viewing window and/or other information. In some implementations, the size of the second viewing window may increase based on decrease in the size of the first viewing window, and the size of the second viewing window may decrease based on increase in the size of the first viewing window.

The graphical user interface component may be configured to effectuate presentation of a graphical user interface on an electronic display. The graphical user interface may include presentation of a first punchout of the visual content based on the first viewing window and a second punchout of the visual content based on the second viewing window.

In some implementations, the first punchout of the visual content based on the first viewing window may include presentation of a first extent of the visual content within the first viewing window based on a first projection. The second punchout of the visual content based on the second viewing window may include presentation of a second extent of the visual content within the second viewing window based on a second projection different from the first projection.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
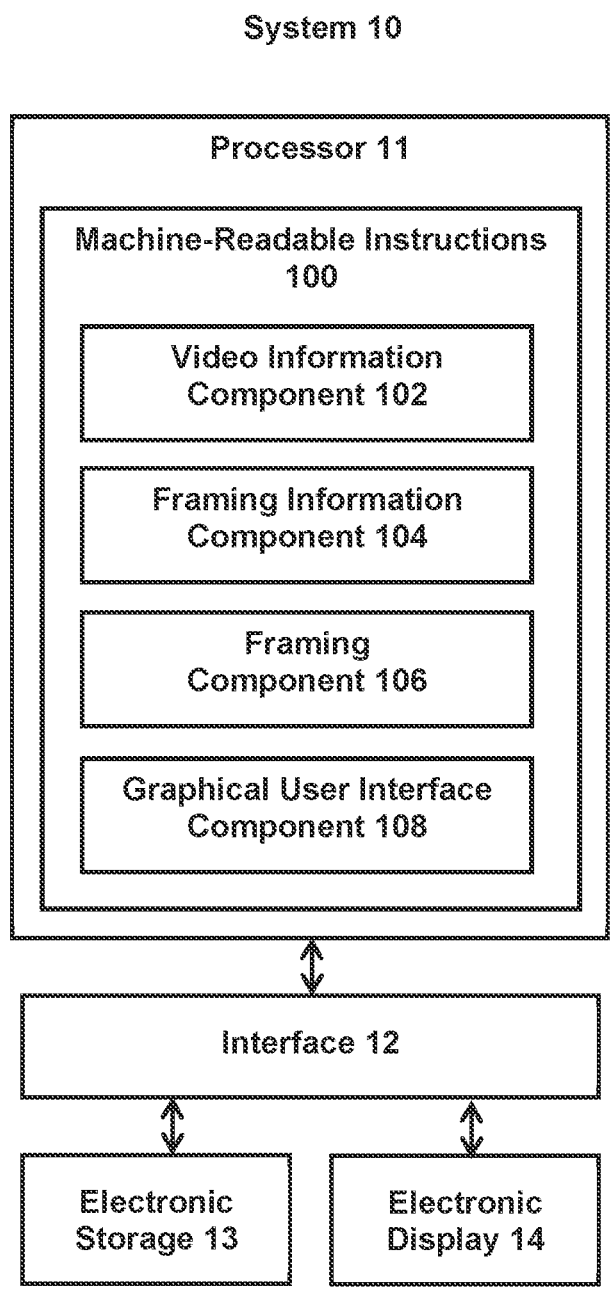
FIG. 1 illustrates an example system for presenting multiple views of videos.

FIG. 1 illustrates a system 10 for presenting multiple views of videos. The system 10 may include one or more of a processor 11, an interface 12 (e.g., bus, wireless interface), an electronic storage 13, an electronic display 14, and/or other components. Video information, framing information, and/or other information may be obtained by the processor 11. The video information may define a video. The video may have a progress length. The video may include visual content viewable as a function of progress through the progress length of the video. The visual content may have a field of view. The framing information for the video may define first framing of the visual content. The first framing may define positioning of a first viewing window within the field of view of the visual content. Second framing of the visual content may be determined by the processor 11 based on the first framing of the visual content and/or other information. The second framing may define positioning of a second viewing window within the field of view of the visual content. Presentation of a graphical user interface on an electronic display may be effectuated by the processor 11. The graphical user interface may include presentation of a first punchout of the visual content based on the first viewing window and a second punchout of the visual content based on the second viewing window.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store video information, information relating to a video, information relating to visual content, framing information, information relating to framing of visual content, information relating to viewing windows, information relating to a graphical user interface, information relating to punchouts of visual content, and/or other information.

The electronic display 14 may refer to an electronic device that provides visual presentation of information. The electronic display 14 may include a color display and/or a non-color display. The electronic display 14 may be configured to visually present information. The electronic display 14 may present information using/within one or more graphical user interfaces. For example, the electronic display 14 may present video information, information relating to a video, information relating to visual content, framing information, information relating to framing of visual content, information relating to viewing windows, information relating to a graphical user interface, information relating to punchouts of visual content, and/or other information.

In some implementations, the electronic display 14 may include a touchscreen display. A touchscreen display may be configured to receive user input via a user's engagement with the touchscreen display. A user may engage with the touchscreen display via interaction with one or more touch-sensitive surfaces/screens and/or other components of the touchscreen display. The electronic display 14 may be a standalone device or a component of a computing device, such as an electronic display of a mobile device (e.g., camera, smartphone, smartwatch, tablet, laptop) or a desktop device (e.g., monitor). User interaction with elements of graphical user interface(s) may be received through the electronic display (e.g., touchscreen display) and/or other user interface devices (e.g., keyboard, mouse, trackpad).

Visual content may refer to content of image(s), video frame(s), and/or video(s) that may be consumed visually. For example, visual content may be included within one or more images and/or one or more video frames of a video. The video frame(s) may define/contain the visual content of the video. The video may include video frame(s) that define/contain the visual content of the video. Video frame(s) may define/contain visual content viewable as a function of progress through the progress length of the video content. A video frame may include an image of the video content at a moment within the progress length of the video. As used herein, the term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files. In some implementations, visual information may be stored within one or more visual tracks of a video.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, the processor 11, the interface 12, the electronic storage 13, and/or the electronic display 14 of the system 10 may be carried by the housing of the image capture device. The image capture device may carry other components, such as one or more optical elements and/or one or more image sensors. References to the housing of an image capture device may refer to the image capture device, and vice versa.

An image capture device may refer to a device that captures visual content. An image capture device may capture visual content in the form of images, videos, and/or other forms. An image capture device may refer to a device for recording visual information in the form of images, videos, and/or other media. An image capture device may be a standalone device (e.g., camera, image sensor) or may be part of another device (e.g., part of a smartphone, tablet).

A video with a wide field of view (e.g., spherical video, panoramic video) may depict a large portion of a scene. The wide field of view of the video may make it difficult for a user to see every spatial extent of the scene depicted within the video. For example, a user may wish to see a zoomed in view of a particular extent of the video, which may result in the user not being able to see other extents of the video. When viewing a zoomed in view of the video, the user may not know what is going on in other extents of the video. The user may not know when the direction and/or the size of view should be changed. The user may not know in what direction the view should be changed and/or whether the view should be made smaller or larger.

The present disclosure enables a user to have a global/more expansive view of videos. A graphical user interface is configured to provide multiple views of a video (e.g., wide field of view video, spherical video, panoramic video) at the same time. The multiple views of the video may include a front view, a rear view, and/or other views. The extent of the video included within the front view may be controlled by the user. For example, a user may manually control the direction of the video in which the front view is located. The user may manually change the direction for the front view (e.g., pan left/right, tilt up/down). As another example, the user may designate a target and the direction of the video in which the front view is located may automatically change to keep the target within view.

The extent of the video included within the rear view may be automatically determined based on the extent of the video included within the front view. The extent of the video included within the rear view may be automatically determined to include the extent of the video opposite the extent included within the front view. The direction of the video in which the front view is located may be opposite the direction of the video in which the rear view is located. When the direction for the front view changes, the direction for the rear view may automatically change to match the change in the front view direction.

The rear view may provide a "rear view mirror" capability to the user. The user may use the front view and the rear view to determine where the user is looking/where the virtual camera is pointed with respect to the entire video. The rear view may provide a view of the video that is not included within the front view.

The rear view may provide a "short cut" capability to the user. The user may click on a point within the rear view mirror to cause the front view to center on the click point. The user may manually control the direction of the ide in which the front view is located. When the direction for the rear view changes, the direction for the rear view may automatically change to match the change in the rear view direction. The rear view may be used to access the extents of the video not included within the front view.

The rear view may use a single projection. Projection may determine how the visual content of the video is mapped onto a surface. Regardless of the projection used in the front view, the rear view may use the same projection (e.g., equirectangular projection, cylindrical projection). The size of the rear view may be set to exclude the extents of the video included in the front view and the extents of the video that have been distorted more than a threshold amount. For example, the entirety of the video may be projected using the equirectangular/cylindrical projection, and a certain amount of edges/periphery of the projected view (e.g., extents included in the front view, extents that are stretched more than a threshold amount) may be removed to generate the rear view.

The rear view may use horizon leveling. Horizon leveling may utilize rotation of the visual content and/or a viewing window for a view (e.g., front view, rear view) so that the extent of the video included in the view appears to be level. Regardless of whether or not horizon leveling is used for the front view, horizon leveling may be applied for the extent of the video included within the rear view. Regardless of whether or not the front view is presented a leveled or tilted view, the rear view may present a leveled view.

The rear view may be vertically fixed. Vertical fixing ay limit change in movement of the rear view. For example, the rear view may be allowed to move up and down in the video by a smaller amount than the front view. As another example, the rear view may not be allowed to move up or down in the video. The horizontal direction of the rear view may automatically change based on changes in the horizontal direction of the front view. The horizontal direction of the rear view may change by the same amount as the changes in the horizontal direction of the front view. The vertical direction of the rear view may change by a smaller amount or not change at all.

Figure 3A:
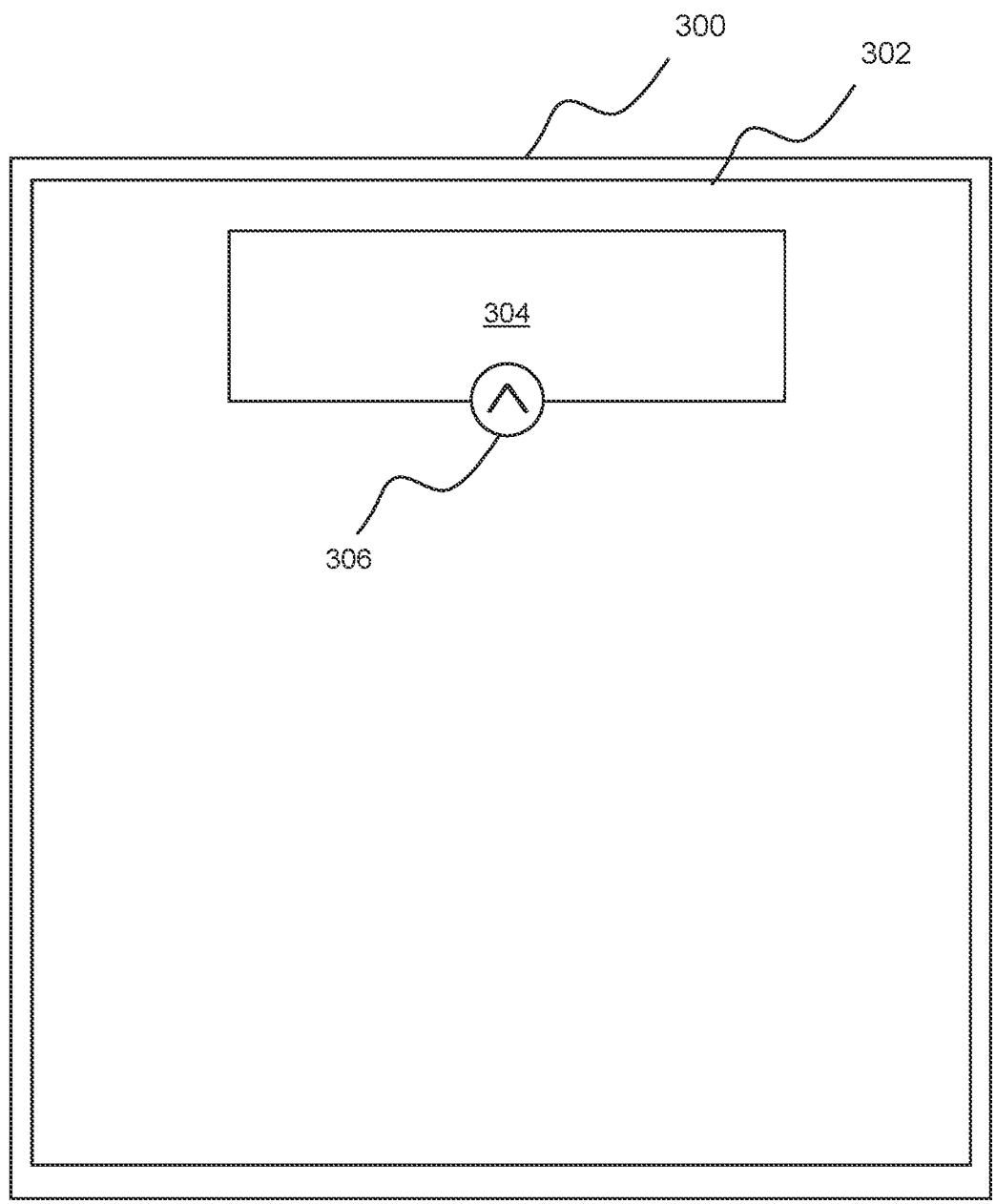
FIG. 3A illustrates an example graphical user interface.
Figure 3B:
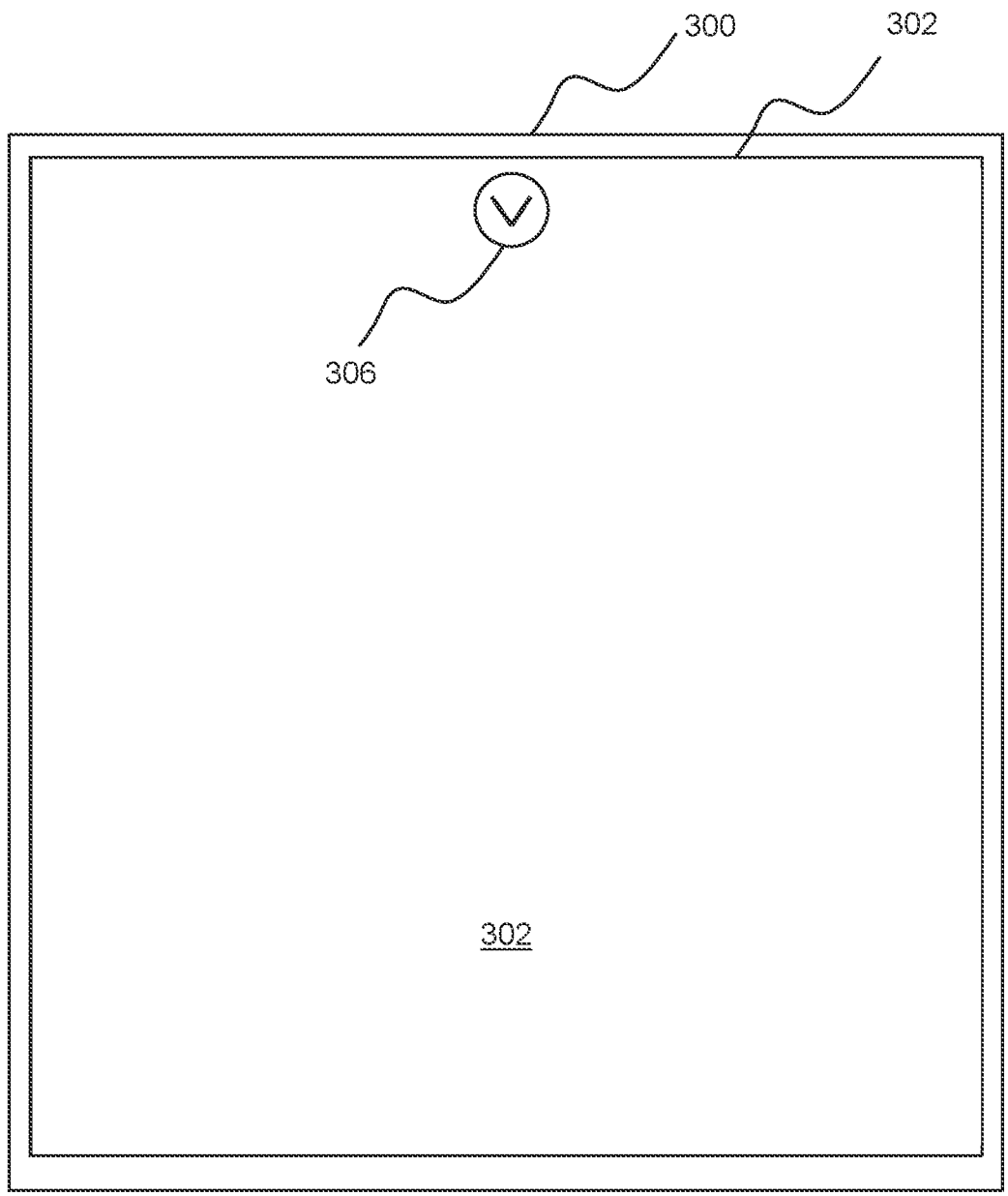
FIG. 3B illustrates an example graphical user interface.

FIGS. 3A and 3B illustrate an example graphical user interface 300. The views of the graphical user interface 300 in FIGS. 3A and 3B are provided merely as examples, and the arrangement and visual aspects of the graphical user interface may vary depending on the implementation. In some implementations, the graphical user interface may include additional features and/or alternative features. In some implementations, the graphical user interface may not include features shown in FIGS. 3A and/or 3B. Other graphical user interfaces are contemplated.

Referring to FIG. 3A, the graphical user interface 300 may include a display sections 302, 304. The display sections 302, 304 may refer to spaces within the graphical user interface 300 that include presentation of visual content. The display sections 302, 304 may include presentation of visual content of a video. The display section 302 may include presentation of a punchout of the visual content. The view of the video provided within the display section 302 may be referred to as a front view, a primary view, and/or other views. The display section 304 may include presentation of another punchout of the visual content. The view of the video provided within the display section 304 may be referred to as a rear view, a secondary view, and/or other views. The display section 302 may include presentation of a particular extent of the video, and the display section 304 may include presentation of the opposite extent of the video. An extent of the video being opposite another extent may include the center of the extent being directly opposite the center of the other extent. An extent of the video being opposite another extent may include the opposite of the center of the extent being near (e.g., within threshold amount/angle of) the center of the other extent. An extent of the video being opposite another extent may include a portion of the extent being opposite the center of the other extent. An extent of the video being opposite another extent may include the extent being horizontally opposite of the other extent. An extent of the video being opposite another extent may not require the extent to be vertically opposite the other extent.

The graphical user interface 300 may include an open/close element 306. The open/close element 306 be interacted upon by a user to input command to open or close the display section 304. For example, responsive to the user interacting with the open/close element 306 while the display section 304 is opened as shown in FIG. 3A may cause the graphical user interface to change as shown in FIG. 3B. In FIG. 3B, the graphical user interface 300 may include the display section 302. In FIG. 3B, the display section 304 may be closed/hidden from view. The user may interact with the open/close element 306 while the display section 304 is closed/hidden to open/show the display section within the graphical user interface 300.

In some implementations, the size and/or the shape of the display section 304 may be static. For example, the size and/or the shape of the display section 304 may remain the same regardless of the amount of the field of view of the video included within the display section 302 and/or the display section 304.

In some implementations, the size and/or the shape of the display section 304 may be dynamic. For example, the size and/or the shape of the display section 304 may change based on the amount of the field of view of the video included within the display section 302 and/or the display section 304. For instance, based on the field of view of the video included within the display section 304 decreasing and/or based on the field of view of the video included within the display section 302 increasing, the size of the display section 304 may decrease. Based on the field of view of the video included within the display section 304 increasing and/or based on the field of view of the video included within the display section 302 decreasing, the size of the display section 304 may increase. Based on the shape of the field of view of the video included within the display section 302 and/or the display section 304 changing, the shape of the display section 304 may change (e.g., aspect ratio change).

In some implementations, the size and/or the shape of the display section 304 may change based on user input. For example, the size and/or the shape of the display section 304 may be controlled by the user, such as by dragging the outside edge of the display section 304.

While FIG. 3A shows the display section 304 overlaid on top of the display section 302, this is merely an example and is not meant to be limiting. Other arrangements/positions of display sections are contemplated.

Referring back to FIG. 1, the processor 11 (or one or more components of the processor 11) may be configured to obtain information to facilitate presenting multiple views of videos. Obtaining information may include one or more of accessing, acquiring, analyzing, capturing, determining, examining, generating, identifying, loading, locating, opening, receiving, retrieving, reviewing, selecting, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor) and/or one or more software components (e.g., software running on a computing device).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate presenting multiple views of videos. The machine-readable instructions 100 may include one or more computer program components. The machine-readable instructions 100 may include one or more of a video information component 102, a framing information component 104, a framing component 106, a graphical user interface component 108, and/or other computer program components.

The video information component 102 may be configured to obtain video information and/or other information. In some implementations, the video information component 102 may obtain video information based on user interaction with a user interface/application (e.g., video editing application, video player application), and/or other information. For example, a user interface/application may provide option(s) for a user to play and/or edit videos. The video information for a video may be obtained based on the user's selection of the video through the user interface/video application. Other selections of a video for retrieval of video information are contemplated.

The video information may define a video. A video may have a progress length. The video may include visual content viewable as a function of progress through the progress length of the video. The progress length of a video may be defined in terms of time durations and/or frame numbers. For example, a video may have a time duration of 60 seconds. A video may have 1800 video frames. A video having 1800 video frames may have a play time duration of 60 seconds when viewed at 30 frames per second. Other progress lengths, time durations, and frame numbers of videos are contemplated.

The visual content may have a field of view. A field of view of a video/visual content may refer to a field of view of a scene captured within the video/visual content (e.g., within video frames). A field of view of a video/visual content may refer to the extent of a scene that is captured within the video/visual content. In some implementations, the field of view of a video/visual content may be greater than or equal to 180-degrees. In some implementations, the field of view of a video/visual content may be smaller than or equal to 180-degrees.

In some implementations, a video may include a wide field of view video. A wide field of view video may refer to a video with a wide field of view. A wide field of view may refer to a field of view that is larger/wider than a threshold field of view/angle. For example, a wide field of view may refer to a field of view that is larger/wider than 60-degrees. In some implementations, a wide field of view video may include a spherical video having a spherical field of view. Spherical field of view may include 360-degrees of capture. Spherical field of view may include views in all directions surrounding the image capture device. Other fields of view of videos are contemplated. A wide field of view video may include and/or may be associated with spatial audio.

Content of one or more videos may be referred to as video content. Video content may include visual content, audio content, and/or other content. For example, video content may include visual content viewable as a function of progress through the progress length of the video, audio content playable as a function of progress through the progress length of the video, and/or other content that may be played back as a function of progress through the progress length of the video.

The video information may define a video by including information that defines one or more content, qualities, attributes, features, and/or other aspects of the video/video content. For example, the video information may define video content by including information that makes up the content of the video and/or information that is used to determine the content of the video. For instance, the video information may include information that makes up and/or is used to determine the arrangement of pixels, characteristics of pixels, values of pixels, and/or other aspects of pixels that define visual content of the video. The video information may include information that makes up and/or is used to determine audio content of the video. Other types of video information are contemplated.

Video information may be stored within a single file or multiple files. For example, video information defining a video may be stored within a video file, multiple video files, a combination of different files (e.g., a visual file and an audio file), and/or other files. Video information may be stored in one or more formats or containers.

The framing information component 104 may be configured to obtaining framing information and/or other information. In some implementations, the framing information component 104 may obtain framing information for a video based on a user's interaction with a user interface/application (e.g., video editing application, video player application), and/or other information. The user interface/application may provide option(s) for a user to set and/or define framing of the video/visual content of the video. For example, the user interface/application may enable the user to select individual moments within the progress length of the video to specify framing of the visual content of the video at the selected moments by setting one or more of the viewing direction, the viewing size, the viewing rotation, the viewing projection, and/or other information to define the framing of the visual content at the selected moments. The user interface/application may provide option(s) for a user to set and/or define framing of the video/visual content of the video with respect to one or more viewing windows. For example, the user input may specify one or more of the viewing direction, the viewing size, the viewing rotation, the viewing projection, and/or other information to define framing of the visual content at one or more moments for one or more viewing windows (e.g., a viewing window to provide the front/primary view).

A viewing direction may define a direction of view for a viewing window. A viewing direction may define the angle/visual portion of the visual content at which a viewing window may be directed. A viewing size may define the size of the viewing window. A viewing size may define a size (e.g., size, magnification, viewing angle) of viewable extents of visual content within the viewing window. A viewing size may define the dimension/shape of the viewing window. A viewing rotation may define a rotation of the viewing window. A viewing rotation may define one or more rotations of the viewing window about one or more axis. A viewing projection may define how pixels within the viewing window is arranged for presentation on an electronic display. A viewing projection may define how the pixels of an image are arranged to form the visual content. A viewing projection may refer to how portions of the visual content/pixels are mapped onto a surface (e.g., two-dimensional plane).

In some implementations, the framing information component 104 may obtain framing information based on the video information and/or the video information component 102 obtaining the video information. For example, the framing information may be associated with the video/video information obtained by the video component 102, and the framing information component 104 may obtain the associated framing information based on obtaining of the video information. The framing information may be included within metadata of the obtained video, and the framing information may be obtained based on obtaining (e.g., selection, retrieval) of the video. The framing information may be included within the video information, and the framing information component 104 may obtain framing information by extracting the framing information from the video information.

In some implementations, the framing information component 104 may obtain framing information based on analysis of the video information and/or the video defined by the video information. For example, visual content detection (e.g., object detection, scene detection, activity detection) and/or audio content detection (e.g., sound detection, speech detection, command detection, cheering detection) may be performed and the framing of the visual content (e.g., number of framing; locations of the framing within the progress length; viewing directions, viewing sizes, viewing rotations, and/or viewing projections of framing) may be determined based on the results of the visual content detection (e.g., object, scene, and/or activity detected within the visual content) and/or the audio content detection (e.g., sound, speech, command, and/or cheering detected within the visual content). That is, content analysis of the video may be used to automatically determine framing of the visual content.

The framing information for the video may define framing of visual content of the video. The framing information for the video may define front/primary view framing of the visual content. The framing may define positioning of a viewing window within the field of view of the visual content. The framing may define positioning of a front/primary viewing window within the field of view of the visual content. The framing for the front/primary viewing window may be referred to as the front/primary framing. The framing may position the viewing window over an extent (spatial extent)) of the visual content. The framing may position the front/primary viewing window over an extent (spatial extent)) of the visual content to be presented on an electronic display.

An individual framing of the visual content may define positioning of a viewing window within the field of view of the visual content at a moment within the progress length. A moment within the progress length may include a point (e.g., a point in time, a video frame) or a duration (e.g., a duration of time, a grouping of adjacent video frames) within the progress length. A viewing window may define the extents of the visual content to be included within a presentation of the video. A viewing window may define extents of the visual content to be included within a punchout of the visual content. A punchout of visual content may refer to an output of one or more portions of the visual content for presentation (e.g., current presentation, future presentation based on video generated using the punchout). A punchout of the visual content may refer to extents of the visual content that is obtained for viewing and/or extraction. The extents of the visual content viewable/extracted within the viewing window may be used to provide views of different spatial parts of the visual content.

A punchout of visual content may include output of a virtual camera. A virtual camera may define one or more spatial extents of the visual content to be output (e.g., for presentation, for storage) based on orientation of the virtual camera with respect to the visual content of the video. A virtual camera may represent the point of view from which different spatial extents of the visual content are observed. Different punchouts of the visual content may include outputs of different virtual cameras to provide views of differential spatial parts of the visual content.

Positioning of a viewing window within the field of view of the visual content may refer to placement of the viewing window within the field of view of the visual content. The positioning/placement of the viewing window may be defined by one or more of viewing direction, viewing size, viewing rotation, and/or other information. Individual framing of the visual content may define (e.g., determine, establish, include, set) positioning of the viewing window within the field of view of the visual content based on the corresponding viewing direction, viewing size, viewing rotation, and/or other information.

An individual framing of the visual content may define arrangement of pixels within the viewing window for presentation. The arrangement of the pixels within the viewing window may be defined by viewing projection and/or other information. Individual framing of the visual content may define corresponding viewing projection of the visual content within the viewing window.

The framing information may define framing of the visual content by including information that defines one or more content, qualities, attributes, features, and/or other aspects of the set of framing/viewing window. For example, the framing information may define framing of the visual content by including information that specifies positioning of a viewing window for different moments within the progress length of the video. The framing information may define framing of the visual content by including information from which the positioning of the viewing window for different moments within the progress length of the video may be determined. Other types of framing information are contemplated.

Figure 4A:
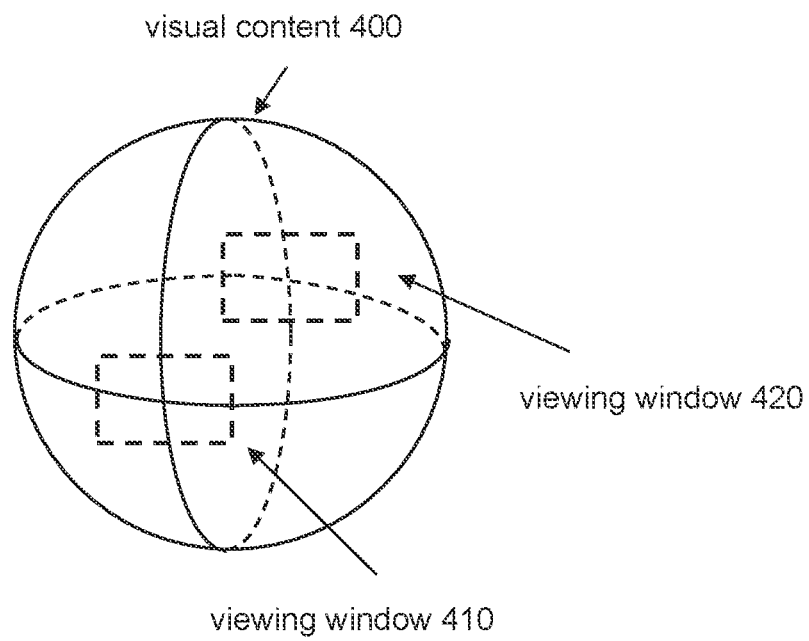
FIG. 4A illustrates example positioning of viewing windows.
Figure 4B:
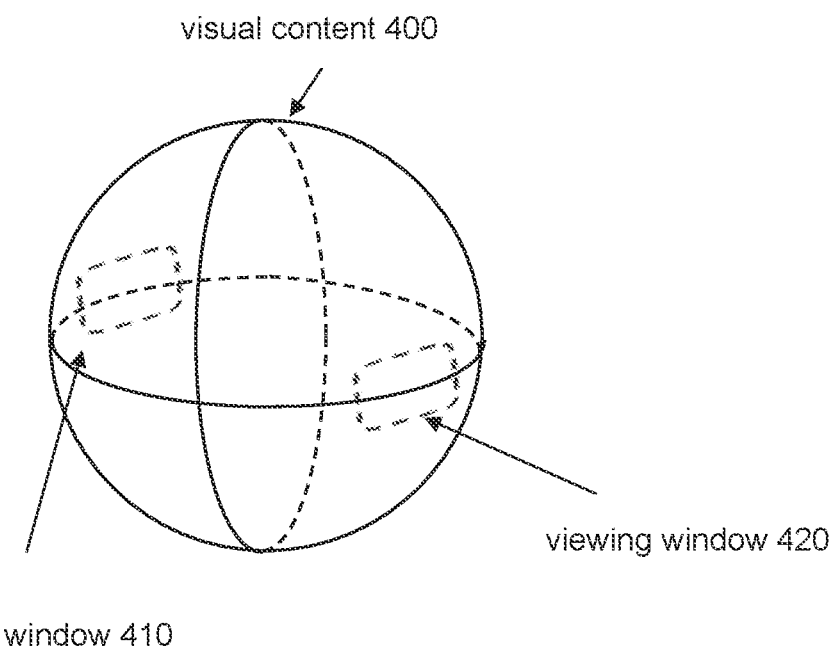
FIG. 4B illustrates example positioning of viewing windows.

FIGS. 4A and 4B illustrate example positioning of viewing windows. In FIG. 4A, viewing windows 410, 420, may be positioned within the field of view (spherical field of view) of visual content 400. The viewing window 410 may be positioned to be centered on one part (e.g., front) of the visual content 400. The viewing window 420 may be positioned to be centered on another part (e.g., back) of the visual content 400.

In FIG. 4B, the viewing windows 410, 420, may be positioned within the field of view (spherical field of view) of visual content 400. The viewing window 410 may be positioned to be centered on one part (e.g., back-right) of the visual content 400. The viewing window 420 may be positioned to be centered on another part (e.g., front-left) of the visual content 400.

The framing component 106 may be configured to determine framing of the visual content. Determining framing of the visual content may include ascertaining, calculating, computing, establishing, finding, setting, and/or otherwise determining the framing of the visual content. The framing component 106 may be configured to determine another framing of the visual content. The other framing of the visual content may be determined based on the framing of the visual content defined by the framing information. The other framing of the visual content may be determined based on the front/primary framing of the visual content.

The other framing may define positioning of another viewing window within the field of view of the visual content. The other framing may be determined based on the front/primary framing to position the other viewing over another extent of the visual content. The extent of the visual content covered by the other viewing window for the other framing may be different from the extent of the visual content covered by the viewing window for the front/primary framing. In some implementations, the extent of the visual content covered by the other viewing window may be opposite the extent of the visual content within the viewing window. The extent of the visual content covered by the other viewing window may be opposite the extent of the visual content within the front/primary viewing window. The other framing may be referred to as rear/secondary framing. The viewing window for the rear/secondary framing may be determined to be opposite the viewing window for the front/primary framing.

A viewing window being opposite another viewing window may include the center of the viewing window being directly opposite the center of the other viewing window. A viewing window being opposite another viewing window may include the opposite of the center of the viewing window being near (e.g., within threshold amount/angle of) the center of the other viewing window. A viewing window being opposite another viewing window may include a portion of the viewing window being opposite the center of the other viewing window. A viewing window being opposite another viewing window may include the viewing window being horizontally opposite of the other viewing window. A viewing window being opposite another viewing window may not require the viewing window to be vertically opposite the other viewing window.

The horizontal position of a viewing window may be dependent on the horizontal position of another viewing window. A horizontal change in the viewing direction of a viewing window may automatically cause the same horizontal change in the viewing direction of another viewing window. For example, a horizontal change in the viewing direction of a viewing window in a clockwise manner (when looking down at the spherical video) may cause the same horizontal change in the viewing direction of the other viewing window in a clockwise manner. The horizontal position of a viewing window may automatically move to keep the same relative horizontal orientation with respect to the other viewing window.

The vertical position of a viewing window may or may not be dependent on the vertical position of another viewing window. A vertical change in the viewing direction of a viewing window may automatically cause the opposite vertical change in the viewing direction of another viewing window. For example, a vertical change in the viewing direction of a viewing window that moves the viewing window upwards may cause the opposite vertical change in the viewing direction of the other viewing window by moving the other viewing window downwards. The vertical position of a viewing window may automatically move to keep the same relative vertical orientation with respect to the other viewing window.

For example, referring to FIGS. 4A and 4B, the positioning of the viewing window 420 may be determined based on the positioning of the viewing window 410. The positioning of the viewing window 420 may be determined to be opposite the positioning of the viewing window 410. In FIG. 4A, based on the viewing window 410 being positioned at the front of the visual content 400, the viewing window 420 may be positioned at the back of the visual content 400. In FIG.>4B, based on the viewing window 410 being positioned at back-right of the visual content 400, the viewing window 420 may be positioned at the front-left of the visual content 400.

Figure 5A:
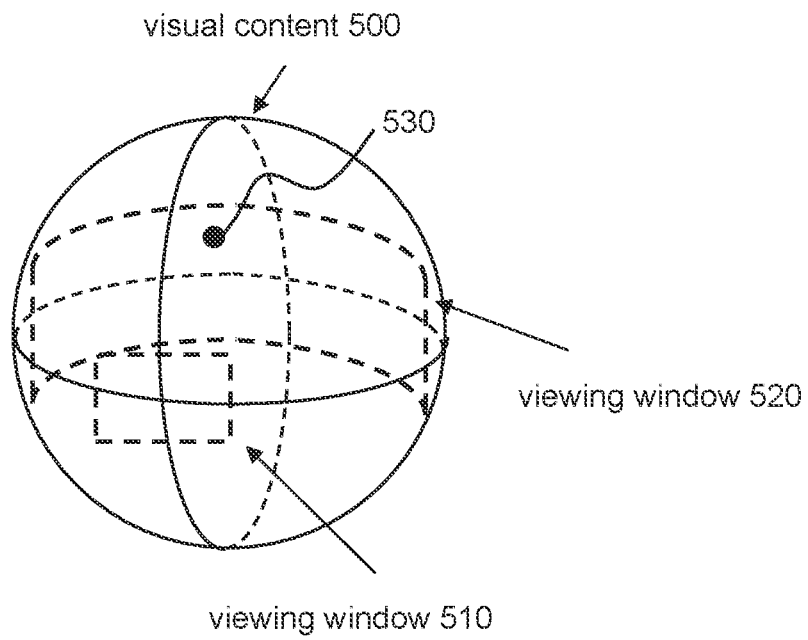
FIG. 5A illustrates example positioning of viewing windows.

The size of the viewing windows may be the same or may be different. The horizontal and/or vertical size of the viewing windows may be the same or may be different. For example, in FIGS. 4A and 4B, the size of the viewing windows 410, 420 may be the same. FIG. 5A shows an example positioning of viewing windows 510, 520 of different sizes. The viewing window 520 may be larger than the viewing window 510. The positioning of the viewing window 520 may be determined based on the positioning of the viewing window 510 to be opposite the viewing window 510. Other sizes of viewing windows are contemplated.

Figure 5B:
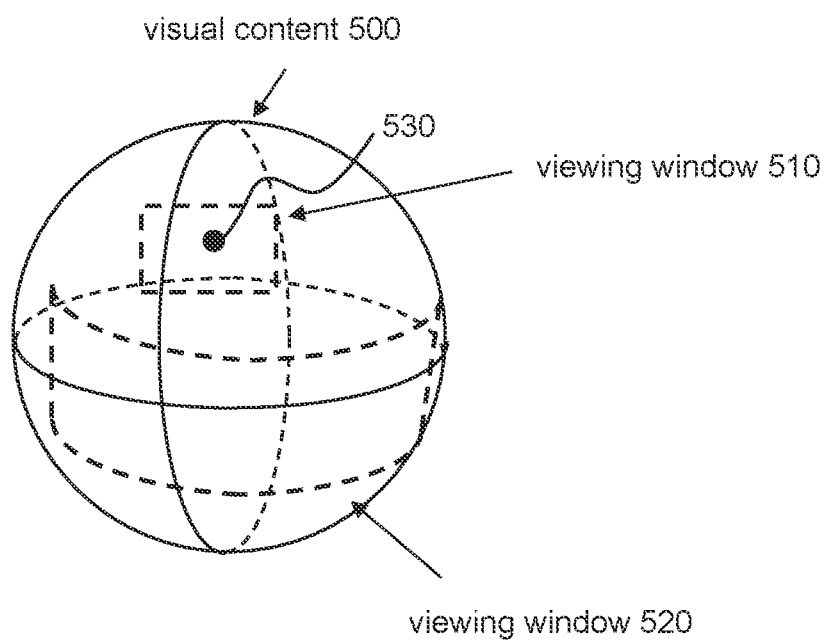
FIG. 5B illustrates example positioning of viewing windows.

A user may select (e.g., click on, hold) a point/area within a view provided using a viewing window as a short cut to change the position of the other viewing window. The position of the other viewing window may be changed to center on the point/area selected by the user. For example, referring to FIG. 5A, the viewing window 510 may be used to provide a front view of visual content 500 and the viewing window 520 may be used to provide a rear view of the visual content 500. A user may select a point within the rear view that corresponds to a point 530 on the visual content 500. Responsive to the user selection, the position of the viewing window 510 may change to center on the point 530, as shown in FIG. 5B. Responsive to the change in position of the viewing window 510, the position of the viewing window 520 may change to stay opposite the viewing window 510.

Figure 5C:
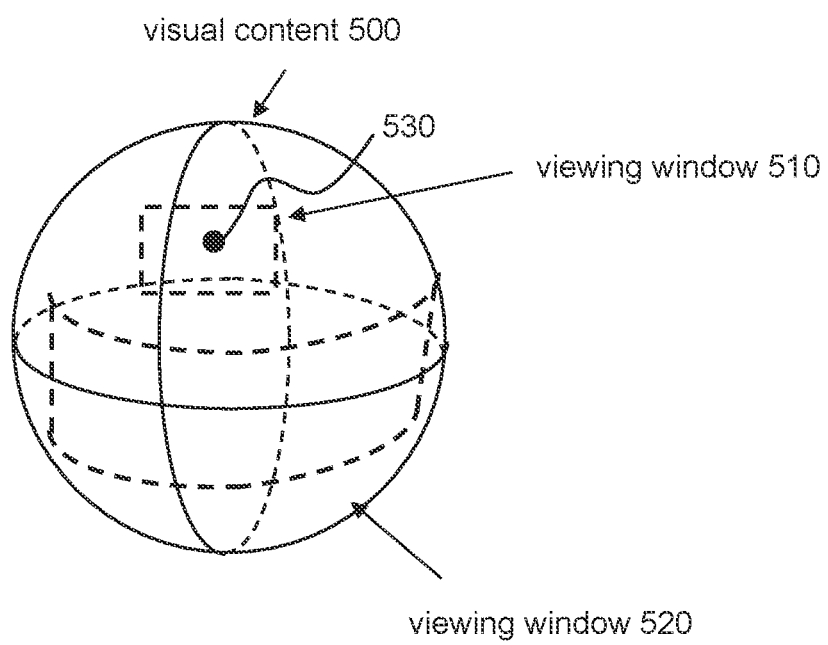
FIG. 5C illustrates example positioning of viewing windows.

The viewing window 520 for the rear view may stay locked on the horizon/vertical mid-line of the visual content 500. For example, referring to FIG. 5C, responsive to the viewing window 510 moving to be centered on the point 530, the viewing window 520 may move to the opposite side of the visual content 500. While the viewing window 520 may be horizontally opposite the viewing window 510, While the viewing window 520 may not be vertically opposite the viewing window 510. Movement of the viewing window 510 may cause lateral movement of the viewing window 520, but the vertical middle of the viewing window 520 may stay on the horizon/vertical mid-line of the visual content 500. Such vertical locking of the viewing window 520 may result in the rear view including lateral motion but not including vertical motion.

Figure 6:
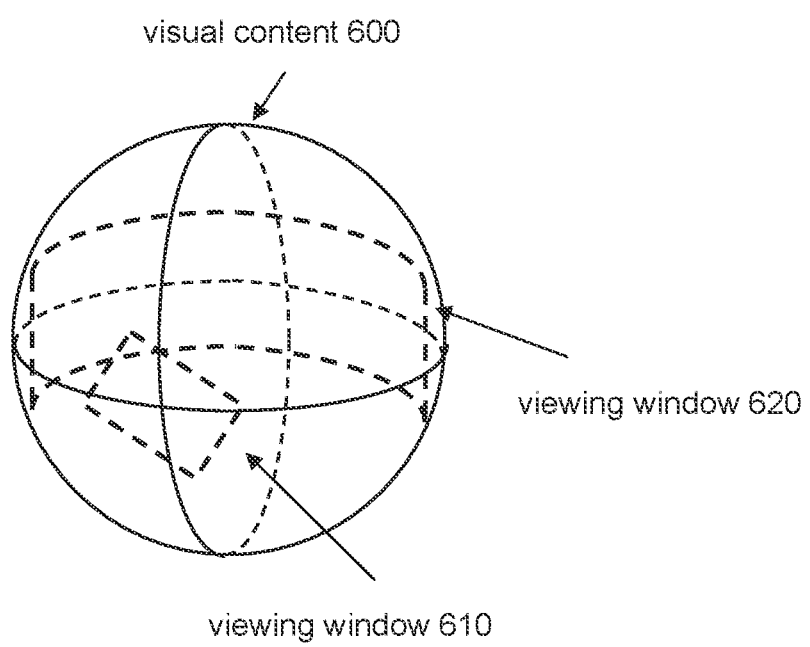
FIG. 6 illustrates example positioning of viewing windows.

'In some implementations, horizontal leveling may be applied to one viewing window but not to another viewing window. For example, horizontal leveling may be applied to the rear view/secondary viewing window but not to the front view/primary viewing window. FIG. 6 illustrates example positioning of viewing windows 610, 620 within visual content 620. The position of the viewing window 620 may be determined based on the position of the viewing window 610. Horizon leveling may not be applied to the viewing window 610. The viewing window 610 may be used to provide a tilted front/primary view of the visual content 600. Horizon leveling may be applied to the viewing window 620. The horizon-leveled viewing window 620 may be used to provide a leveled rear/secondary view of the visual content 600. Such difference in application of horizon leveling may enable the front/primary view to include scenes of different tilt while keeping the rear/secondary view horizontally stable.

The size of the viewing windows may be static or dynamic. For example, the size of the viewing window for the front/primary view may be dynamic while the size of the viewing window for the rear/secondary view may be static. The size of the viewing window for the front/primary view may change based on user input and/or automatically (e.g., to keep a target framed). The size of the viewing window for the rear/secondary view may stay the same regardless of any change in the size of the viewing window for the front/primary view.

As another example, the size of the viewing windows for the front/primary view and the rear/secondary view may be dynamic. The size of one viewing window may be determined based on the size of the other viewing window. For example, the size of one viewing window may increase based on decrease in the size of the other window, and vice versa. The size of the viewing windows may be limited. For example, the viewing windows for the front/primary view and/or the rear/secondary view may have maximum size and/or minimum size. The viewing window for the front/primary view and the viewing window for the rear/secondary view may have the same maximum/minimum size or have different maximum/minimum size.

The projection of the viewing windows may be the same or may be different. The extents of the visual content within the viewing windows may be projected in the same manner or in different manners. For example, the projection of the viewing window for the front/primary view may be dynamic. For instance, the projection of the viewing window for the front/primary view may be selected by the user and/or based on analysis of the visual content (e.g., object detection, scene detection). The projection of the viewing window for the rear/secondary view may be static. Regardless of the projection used for the front/primary view, the rear/secondary view may use the same projection (e.g., equirectangular projection, cylindrical projection).

The graphical user interface component 108 may be configured to effectuate presentation of one or more graphical user interface on one or more electronic displays (e.g., the electronic display 14). Effectuating presentation of a graphical user interface on an electronic display may include causing, bringing about, facilitating, and/or otherwise effectuating presentation of the graphical user interface on the electronic display.

A graphical user interface may refer to a user interface that enables a user to interact with the system 10 through one or more interface elements. A graphical user interface may refer to a user interface that enables the system 10 to provide information to a user through one or more interface elements. A graphical user interface may include interface elements. A graphical user interface may be static or dynamic. A graphical user interface may include a static configuration of interface elements and/or include dynamic configurations of interface elements that changes (e.g., with time, based on user interaction with one or more interface elements). Multiple/different interface elements may be presented/included within a graphical user interface at the same time, may be presented/included within a graphical user interface at different times, and/or may be presented/included within a graphical user interface responsive to user interaction with one or more other interface elements and/or other information.

The graphical user interface may include presentation of one or more punchouts of the visual content. One or more punchouts of the visual content may be included within the graphical user interface to provide views of one or more different spatial extents of the visual content.

A punchout of the visual content may be presented based on a viewing window and/or other information. For example, the graphical user interface may include presentation of one punchout of the visual content based on a front/primary viewing window and presentation of another punchout of the visual content based on a rear/secondary viewing window. The punchout of the visual content based on a front/primary viewing window may include extent of the visual content within the front/primary viewing window. The punchout of the visual content based on a rear/secondary viewing window may include extent of the visual content within the rear/secondary viewing window.

A punchout of the visual content may be presented based on a projection. The punchout of the visual content based on a front/primary viewing window may include presentation of the extent of the visual content within the front/primary viewing window based on the projection for the front/primary viewing window. The punchout of the visual content based on a rear/secondary viewing window may include presentation of the extent of the visual content within the rear/secondary viewing window based on the projection for the rear/secondary viewing window. The projection for the front/primary viewing window may be the same or may be different from the projection for the rear/secondary viewing window.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

While the implementations of the disclosure are described with respect to the system 10, this is merely as an example and is not meant to be limiting. In some implementation, some or all of the functionalities attributed herein to the system 10 may be performed by another system, one or more computing devices, and/or one or more processing apparatuses (e.g., tangible hardware/equipment that processes information). In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 13, and the electronic display 14 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of the computer program components may provide more or less functionality than is described. For example, one or more of the computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
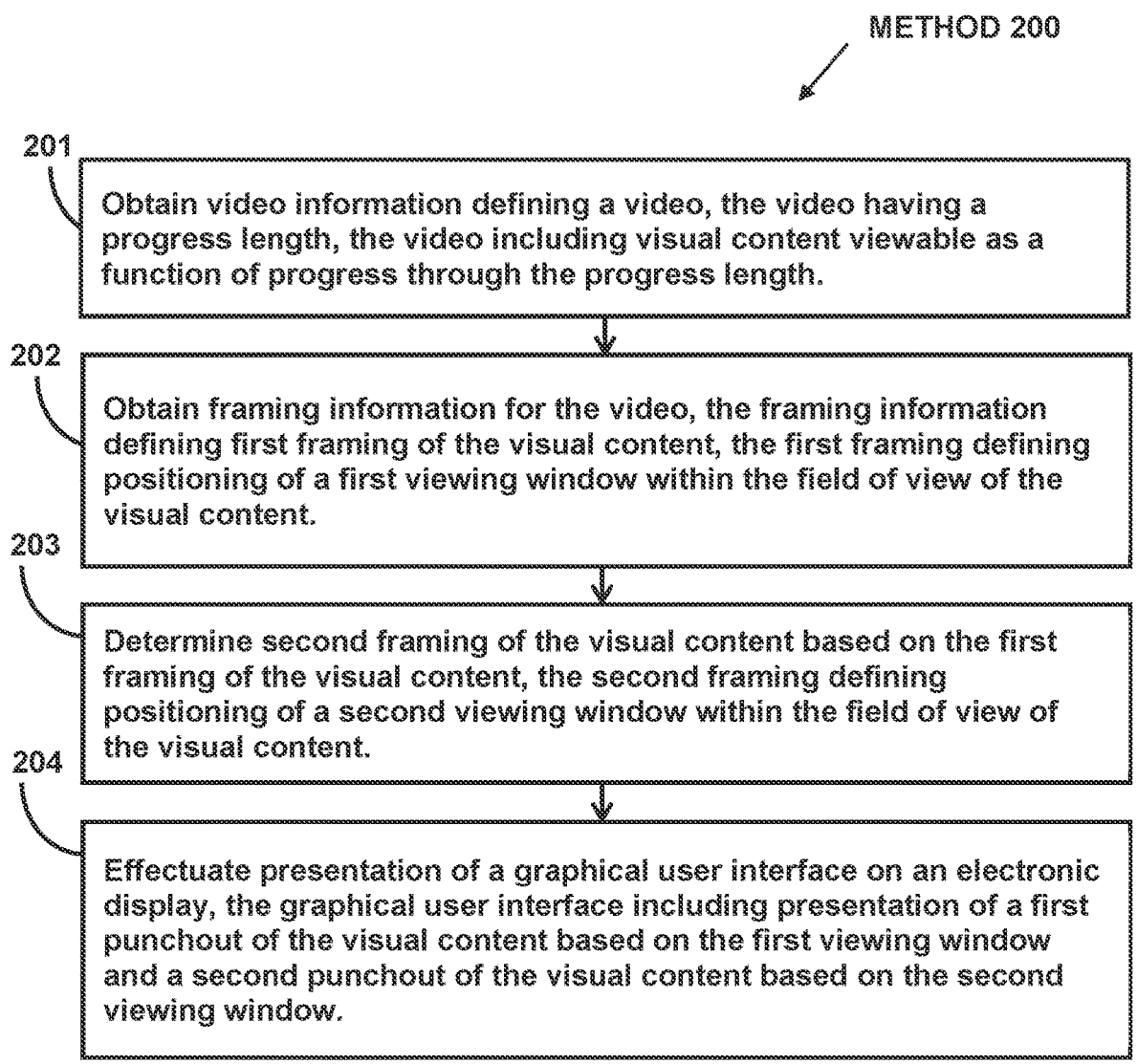
FIG. 2 illustrates an example method for presenting multiple views of videos.

FIG. 2 illustrates method 200 for presenting multiple views of videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, video information may be obtained. The video information may define a video. The video may have a progress length. The video may include visual content viewable as a function of progress through the progress length of the video. The visual content may have a field of view. In some implementations, operation 201 may be performed by a processor component the same as or similar to the video information component 102 (Shown in FIG. 1 and described herein).

At operation 202, framing information may be obtained. The framing information for the video may define first framing of the visual content. The first framing may define positioning of a first viewing window within the field of view of the visual content. In some implementations, operation 202 may be performed by a processor component the same as or similar to the framing information component 104 (Shown in FIG. 1 and described herein).

At operation 203, second framing of the visual content may be determined based on the first framing of the visual content and/or other information. The second framing may define positioning of a second viewing window within the field of view of the visual content. In some implementations, operation 203 may be performed by a processor component the same as or similar to the framing component 106 (Shown in FIG. 1 and described herein).

At operation 204, presentation of a graphical user interface on an electronic display may be effectuated. The graphical user interface may include presentation of a first punchout of the visual content based on the first viewing window and a second punchout of the visual content based on the second viewing window. In some implementations, operation 204 may be performed by a processor component the same as or similar to the graphical user interface component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for presenting multiple views of videos, the system comprising:
one or more physical processors configured by machine-readable instructions to:
obtain video information defining a spherical video, the spherical video having a progress length, the spherical video including visual content viewable as a function of progress through the progress length, the visual content having a field of view;
obtain framing information for the spherical video, the framing information defining primary framing of the visual content, the primary framing defining positioning of a primary viewing window over a primary extent of the visual content within the field of view of the visual content;
automatically determine rear framing of the visual content based on the primary framing of the visual content, the rear framing defining positioning of a rear viewing window within the field of view of the visual content, wherein the rear framing is determined based on the primary framing to position the rear viewing window over an extent of the visual content that is opposite the primary extent of the visual content, further wherein the positioning of the rear viewing window within the field of view of the visual content automatically changes to match changes in the positioning of the primary viewing window within the field of view of the visual content over the progress length of the spherical video, wherein the positioning of the rear viewing window within the field of view of the visual content being automatically changed to match changes in the positioning of the primary viewing window within the field of view of the visual content over the progress length of the spherical video includes horizontal positioning of the rear viewing window having same changes as changes in horizontal positioning of the primary viewing window and vertical positioning of the rear viewing window having smaller changes than changes in vertical positioning of the primary viewing window; and
effectuate presentation of a graphical user interface on an electronic display, the graphical user interface including simultaneous presentation of a primary punchout of the visual content based on the primary viewing window and a rear punchout of the visual content based on the rear viewing window, the presentation of the primary punchout of the visual content providing a front view of the visual content and the presentation of the rear punchout of the visual content providing a rear mirror view of the visual content, the simultaneous presentation of the primary punchout and the rear punchout of the visual content providing the front view and the review mirror view of the visual content at the same time.

2. The system of claim 1, wherein:
horizon leveling is not applied to the primary viewing window;
the horizon leveling is applied to the rear viewing window; and
when the primary viewing window is tilted with respect to horizon, the rear viewing window is leveled with respect to horizon.

3. A system for presenting multiple views of videos, the system comprising:
one or more physical processors configured by machine-readable instructions to:
obtain video information defining a video, the video having a progress length, the video including visual content viewable as a function of progress through the progress length, the visual content having a field of view;
obtain framing information for the video, the framing information defining primary framing of the visual content, the primary framing defining positioning of a primary viewing window over a primary extent of the visual content within the field of view of the visual content;
automatically determine rear framing of the visual content based on the primary framing of the visual content, the rear framing defining positioning of a rear viewing window within the field of view of the visual content, wherein the rear framing is determined based on the primary framing to position the rear viewing window over an extent of the visual content that is opposite the primary extent of the visual content, further wherein the positioning of the rear viewing window within the field of view of the visual content automatically changes to match changes in the positioning of the primary viewing window within the field of view of the visual content over the progress length of the video; and
effectuate presentation of a graphical user interface on an electronic display, the graphical user interface including simultaneous presentation of a primary punchout of the visual content based on the primary viewing window and a rear punchout of the visual content based on the rear viewing window, the presentation of the primary punchout of the visual content providing a front view of the visual content and the presentation of the rear punchout of the visual content providing a rear mirror view of the visual content, the simultaneous presentation of the primary punchout and the rear punchout of the visual content providing the front view and the review mirror view of the visual content at the same time.

4. The system of claim 3, wherein:
a size of the primary viewing window is dynamic; and
a size of the rear viewing window is static.

5. The system of claim 3, wherein:
a size of the primary viewing window is dynamic;
a size of the rear viewing window is dynamic; and
the size of the rear viewing window is automatically changed based on change in the size of the primary viewing window.

6. The system of claim 5, wherein:
the size of the rear viewing window automatically increases based on decrease in the size of the primary viewing window; and
the size of the rear viewing window automatically decreases based on increase in the size of the primary viewing window.

7. The system of claim 3, wherein:
horizon leveling is not applied to the primary viewing window;
the horizon leveling is applied to the rear viewing window; and
when the primary viewing window is tilted with respect to horizon, the rear viewing window is leveled with respect to horizon.

8. The system of claim 3, wherein the video includes a spherical video.

9. A method for presenting multiple views of videos, the method performed by a computing system including one or more processors, the method comprising:
obtaining, by the computing system, video information defining a video, the video having a progress length, the video including visual content viewable as a function of progress through the progress length, the visual content having a field of view;
obtaining, by the computing system, framing information for the video, the framing information defining primary framing of the visual content, the primary framing defining positioning of a primary viewing window over a primary extent of the visual content within the field of view of the visual content;
automatically determining, by the computing system, rear framing of the visual content based on the primary framing of the visual content, the rear framing defining positioning of a rear viewing window within the field of view of the visual content, wherein the rear framing is determined based on the primary framing to position the rear viewing window over an extent of the visual content that is opposite the primary extent of the visual content, further wherein the positioning of the rear viewing window within the field of view of the visual content automatically changes to match changes in the positioning of the primary viewing window within the field of view of the visual content over the progress length of the video; and
effectuating, by the computing system, presentation of a graphical user interface on an electronic display, the graphical user interface including simultaneous presentation of a primary punchout of the visual content based on the primary viewing window and a rear punchout of the visual content based on the rear viewing window, the presentation of the primary punchout of the visual content providing a front view of the visual content and the presentation of the rear punchout of the visual content providing a rear mirror view of the visual content, the simultaneous presentation of the primary punchout and the rear punchout of the visual content providing the front view and the review mirror view of the visual content at the same time.

10. The method of claim 9, wherein:
a size of the primary viewing window is dynamic; and
a size of the rear viewing window is static.

11. The method of claim 9, wherein:
a size of the primary viewing window is dynamic;
a size of the rear viewing window is dynamic; and
the size of the rear viewing window is automatically changed based on change in the size of the primary viewing window.

12. The method of claim 11, wherein:
the size of the rear viewing window automatically increases based on decrease in the size of the primary viewing window; and
the size of the rear viewing window automatically decreases based on increase in the size of the primary viewing window.

13. The method of claim 9, wherein:
horizon leveling is not applied to the primary viewing window;
the horizon leveling is applied to the rear viewing window; and
when the primary viewing window is tilted with respect to horizon, the rear viewing window is leveled with respect to horizon.

14. The method of claim 9, wherein the video includes a spherical video.

15. The system of claim 3, wherein the positioning of the rear viewing window within the field of view of the visual content being automatically changed to match changes in the positioning of the primary viewing window within the field of view of the visual content over the progress length of the video includes horizontal positioning of the rear viewing window having same changes as changes in horizontal positioning of the primary viewing window.

16. The system of claim 15, wherein the positioning of the rear viewing window within the field of view of the visual content being automatically changed to match changes in the positioning of the primary viewing window within the field of view of the visual content over the progress length of the video further includes vertical positioning of the rear viewing window having smaller changes than changes in vertical positioning of the primary viewing window.

17. The system of claim 3, wherein:
the rear mirror view of the visual content provides a short-cut capability for user selection of a point within a given extent of the visual content within the rear punchout of the visual content; and
responsive to the user selection of the point within the given extent of the visual content within the rear punchout of the visual content, the positioning of the primary viewing window is changed to be centered over the point within the given extent of the visual content and the positioning of the rear viewing window is automatically changed to be opposite the primary viewing window.

18. The method of claim 9, wherein the positioning of the rear viewing window within the field of view of the visual content being automatically changed to match changes in the positioning of the primary viewing window within the field of view of the visual content over the progress length of the video includes horizontal positioning of the rear viewing window having same changes as changes in horizontal positioning of the primary viewing window.

19. The method of claim 18, wherein the positioning of the rear viewing window within the field of view of the visual content being automatically changed to match changes in the positioning of the primary viewing window within the field of view of the visual content over the progress length of the video further includes vertical positioning of the rear viewing window having smaller changes than changes in vertical positioning of the primary viewing window.

20. The method of claim 9, wherein:
the rear mirror view of the visual content provides a short-cut capability for user selection of a point within a given extent of the visual content within the rear punchout of the visual content; and
responsive to the user selection of the point within the given extent of the visual content within the rear punchout of the visual content, the positioning of the primary viewing window is changed to be centered over the point within the given extent of the visual content and the positioning of the rear viewing window is automatically changed to be opposite the primary viewing window.

* * * * *